May 1, 1934.  S. DAVIS  1,957,325
SOLDERING IRON
Filed Nov. 20, 1933  2 Sheets-Sheet 2
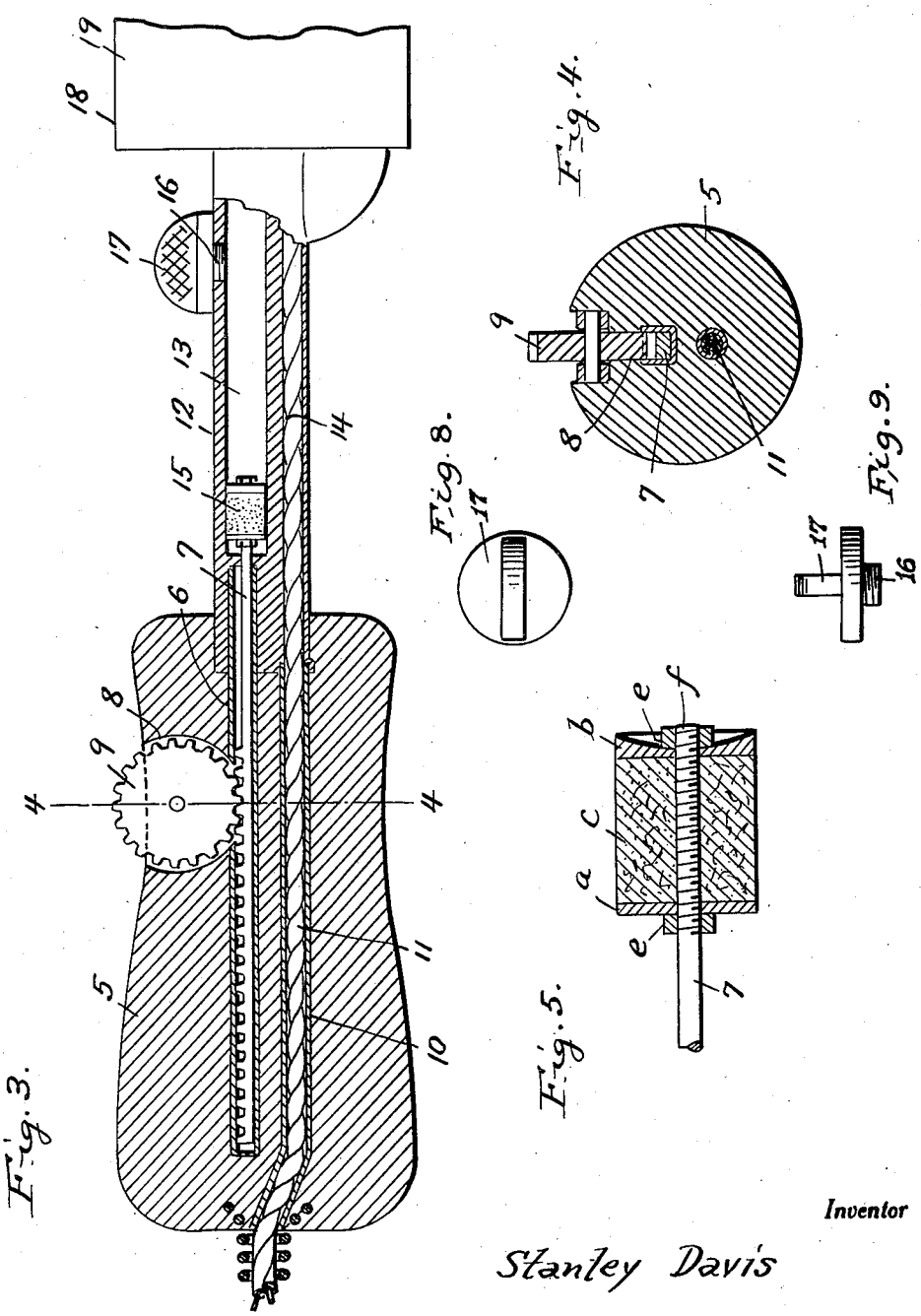
Inventor
Stanley Davis
By Clarence A. O'Brien
Attorney Patented May 1, 1934

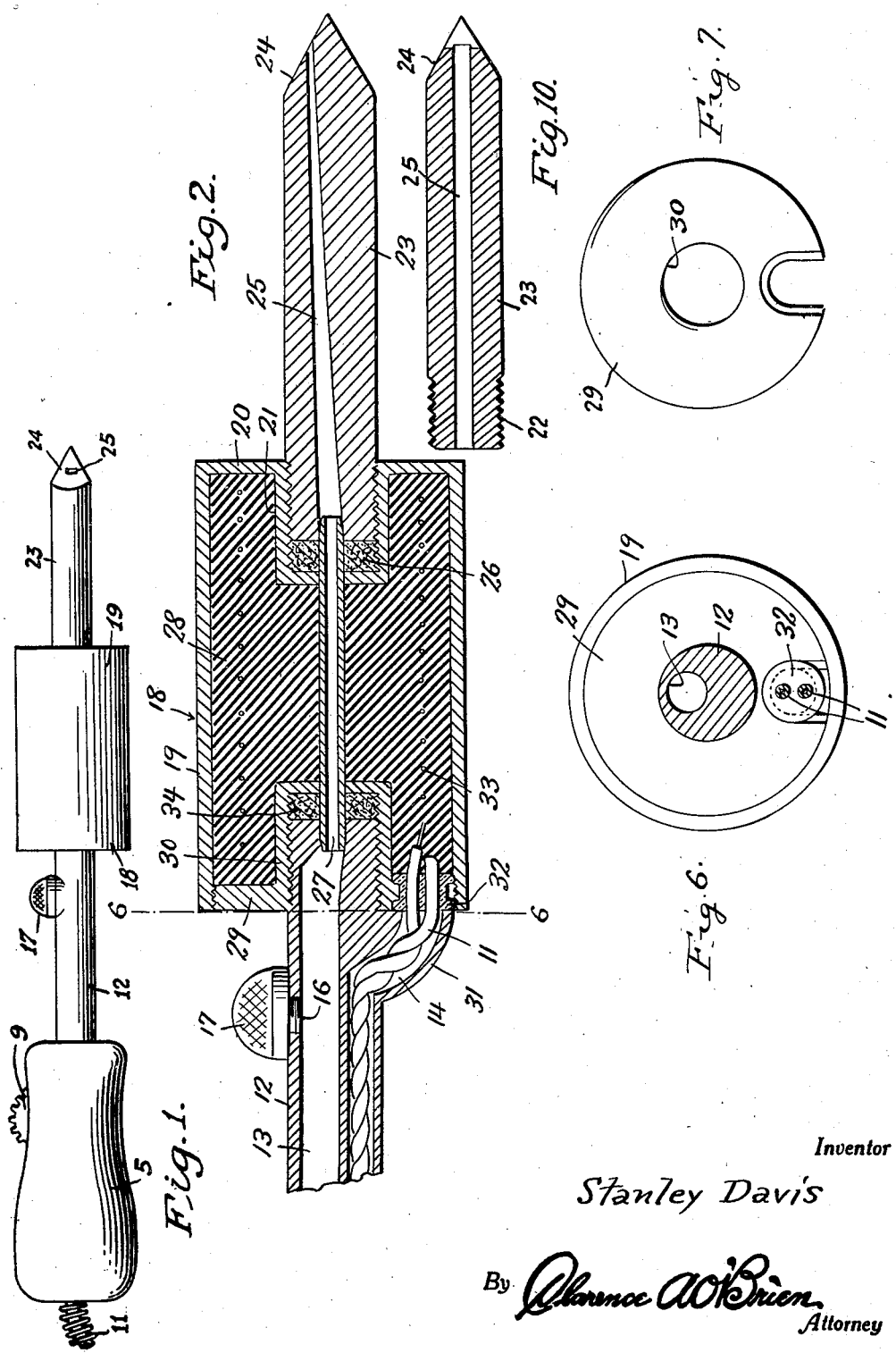

1,957,325

UNITED STATES PATENT OFFICE 1,957,325

SOLDERING IRON

Stanley Davis, Bayport, N. Y.

Application November 20, 1933, Serial No. 698,866

2 Claims. (Cl. 113—109)

This invention appertains to new and useful improvements in soldering irons, and more particularly to an iron of the abundant solder supply type.

The principal object of the present invention is to provide a soldering iron wherein a supply of solder is contained therein and further provided with means whereby this supply of solder can be fed to the hot point, as desired.

Another important object of the invention is to provide an electrical soldering iron having convenient means whereby solder can be fed to the hot point in an easy manner and with the same hand that holds the instrument.

These and various other important objects and advantages of the invention will become apparent to the reader of the following specification.

In the drawings:—

Figure 1 represents a side elevational view of the instrument.

Figure 2 represents a fragmentary longitudinal sectional view through the forward portion of the instrument.

Figure 3 represents a fragmentary longitudinal sectional view through the handle portion of the instrument.

Figure 4 represents a cross sectional view taken substantially on the line 4—4 of Figure 3.

Figure 5 represents a longitudinal sectional view through the solder feed piston.

Figure 6 represents a cross sectional view taken substantially on line 6—6 of Figure 2.

Figure 7 represents an outside end elevational view of the socket member shown in Figure 2.

Figure 8 represents a top plan view of the closure shown in Figure 2.

Figure 9 represents a side elevational view of the closure shown in Figures 8 and 2.

Figure 10 represents a longitudinal sectional view through the iron proper.

Referring to the drawings wherein like numerals designate like parts, it can be seen that numeral 5 represents a handle of some suitable resistant material for both electricity and heat and this is provided with an elongated passageway therein for receiving the tube 6 in which the rack bar 7 is slidable. A semi-circular cut-out portion 8 is provided in the handle 5 and within this is mounted the gear wheel 9 which meshes with the rack bar 7 and has a portion of its periphery protruding beyond the outer surface of the handle 5 so that the same can be readily actuated by a finger of the hand holding the handle 5.

An elongated passageway is provided longitudinally through the handle 5 and a tube 10 is disposed through the passageway, the tube serving as a conduit for the electric cord 11.

Numeral 12 represents an elongated body having a solder chamber 13 therein and a bore 14 extending therethrough. This body 12 is disposed into a recess in the forward end of the handle 5 and the rack bar 7 connects to the piston 15 in the said solder chamber 13. This piston consists of a pair of plates a—b at each end of the piston body c, which is of some suitable heat resisting material and these plates a—b are clamped against the ends of the body c by nuts e feedable on the threaded portion f of the aforementioned rack bar 7, that is, the portion protruding into the chamber 13.

The body 12 is provided with a threaded opening therein which serves as a filler opening so that solder can be placed in the chamber 13. A threaded plug 16 is provided for this filler opening and a wing 17 is provided on this plug whereby the plug can be easily disposed into place or removed, as desired.

As is clearly shown in Figure 2, numeral 18 represents the heating means for the iron which consists of the outer shell 19 closed at its forward end 20 and this forward end is provided with an internally threaded socket structure 21 for receiving the threaded end portion 22 of the iron proper 23 which is provided with a perimetrical-shaped end portion or hot point 24. A melted solder duct 25 extends longitudinally through this iron 23, the duct being substantially larger in transverse area at its inner end than at its outer end, this transverse area gradually diminishing from its inner end toward its outer end. The outer end of the duct emerges through one of the surfaces of the hot point.

Suitable packing 26 is provided between the back portion of the socket 21 and the inner end of the iron 23 and this packing circumscribes the forward end of the tube 27 which extends longitudinally through the insulation body 28 which fills the interior of the shell 19. At the backward end of the shell 19, the interior is threaded to receive the threaded periphery of the plate 29 which is provided with an internally threaded socket structure 30 for receiving the forward threaded end of the body 12. The body 12, at its forward end, is provided with an offset portion 31 through which the passageway 14 is continued and this plate 29 is provided with an opening therein for receiving the porcelain or glass plug 32 through which the wires of the cord 11 are disposed for connection to the electrical heating element 33 embedded in the insulation 28.

Surrounding the rear end portion of the bolt and solder tube 27 is the packing 34 and as is clearly shown, the rear end of the tube 27 protrudes into the solder chamber 13 of the body 12, while the forward end of the tube 27 protrudes into the duct 25 of the iron 23.

Obviously, it can be seen that when the chamber 13 is properly charged with solder, the same can be fed through the tube 27 to the iron 23 by simply moving the gear wheel 9 slightly so as to project the rack bar 7 forwardly and urge the piston against the contents of the chamber 13. Obviously, as the solder is forced toward the heater 18, the same will melt and flow through the duct 25 under pressure of the piston.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A soldering iron comprising a handle, a conduit extending from the handle, an iron head, a heater unit connecting the head to the hollow body, said head being provided with a solder duct extending longitudinally therethrough, a tube extending longitudinally through the heating unit and protruding at its back end into said hollow body, said hollow body being adapted to contain a supply of solder, means movable in the said hollow body for feeding the said solder forwardly and through the said tube and duct to the hot point of the iron, said feed means consisting of a piston in the hollow body, a rack slidable in the handle, and a gear wheel meshing with the rack, which when rotated, will feed the rack and piston.

2. A soldering iron comprising a handle, a conduit extending from the handle, an iron head, a heater unit connecting the head of the hollow body, said head being provided with a solder duct extending longitudinally therethrough, a tube extending longitudinally through the heating unit and protruding at its back end into the said hollow body, said hollow body being adapted to contain a supply of solder, means movable in the said hollow body for feeding the said solder forwardly and through the said tube and duct to the hot point of the iron, said feed means consisting of a piston in the hollow body, a rack slidable in the handle, a gear wheel meshing with the rack which, when rotated, will feed the rack and piston, said handle being provided with an opening through one side thereof in which the said gear is mounted so that a portion of its periphery will project beyond the outer surface of the handle and can be engaged by the hand holding the handle.

STANLEY DAVIS.